(12) United States Patent
Ott et al.

(10) Patent No.: US 9,509,456 B2
(45) Date of Patent: Nov. 29, 2016

(54) POWER SUPPLY LINE DATA TRANSMISSION

(71) Applicant: MELEXIS TECHNOLOGIES N.V., Tessenderlo (BE)

(72) Inventors: Andreas Ott, Erfurt (DE); Thomas Freitag, Plaue (DE); Michael Bender, Erfurt (DE); Michael Frey, Erfurt (DE)

(73) Assignee: MELEXIS TECHNOLOGIES NV, Tessenderl O (BE)

( * ) Notice: Subject to any disclaimer, the term of this patent is extended or adjusted under 35 U.S.C. 154(b) by 79 days.

(21) Appl. No.: 14/608,868

(22) Filed: Jan. 29, 2015

(65) Prior Publication Data
US 2015/0222398 A1 Aug. 6, 2015

(30) Foreign Application Priority Data

Jan. 31, 2014 (GB) .................................. 1401643.0

(51) Int. Cl.
| | |
|---|---|
| *H04L 1/22* | (2006.01) |
| *H04L 12/40* | (2006.01) |
| *H04J 11/00* | (2006.01) |
| *H04J 13/00* | (2011.01) |
| *H04B 3/54* | (2006.01) |
| *B60L 11/18* | (2006.01) |

(52) U.S. Cl.
CPC .............. *H04L 1/22* (2013.01); *B60L 11/1816* (2013.01); *B60L 11/1838* (2013.01); *H04B 3/54* (2013.01); *H04B 3/542* (2013.01); *H04B 3/548* (2013.01); *H04J 11/00* (2013.01); *H04J 13/00* (2013.01); *H04L 12/40032* (2013.01);
(Continued)

(58) Field of Classification Search
CPC ......... H04B 3/54; H04B 3/542; H02J 13/00; H04J 13/002
See application file for complete search history.

(56) References Cited

U.S. PATENT DOCUMENTS 6,061,555 A * 5/2000 Bultman .................. H04B 7/12 370/497
6,288,631 B1 9/2001 Shinozaki et al.
(Continued)

FOREIGN PATENT DOCUMENTS

| WO | 00/24120 A1 | 4/2000 |
|---|---|---|
| WO | 00/38402 A1 | 6/2000 |
| WO | 2009036834 A1 | 3/2009 |

OTHER PUBLICATIONS

F. Nouvel, P. Tanguy, S. Pillement, H. Pham, Experiments of In-Vehicle Power Line Communications, Chapter 14 from Advances in Vehicular Networking Technologies, Apr. 11, 2011, pp. 255-278.*

(Continued)

*Primary Examiner* — Christopher Crutchfield
(74) *Attorney, Agent, or Firm* — Workman Nydegger

(57) ABSTRACT

A transmitter and a receiver for transmitting and receiving data via a power supply line comprise a local signal port for respectively receiving and transmitting a serial bit stream and a power line connection port for respectively transmitting a radio frequency signal and receiving the radio frequency signal via the power supply line. The transmitter comprises a modulator unit adapted for encoding the serial bit stream into a baseband signal and generating the radio frequency signal by mixing the baseband signal with a carrier wave so as to redundantly convey the at least one baseband signal in at least four spectral sidebands of the carrier wave. The receiver comprises a demodulator unit adapted for detecting the at least four spectral sidebands of the carrier wave in the radio frequency signal, isolating a baseband signal from the at least four spectral sidebands and decoding the baseband signal into the serial bit stream.

18 Claims, 7 Drawing Sheets

Frequency / MHz

(52) U.S. Cl.
CPC ........... *H04B 2203/547* (2013.01); *H04B 2203/5416* (2013.01); *H04B 2203/5445* (2013.01); *H04L 2012/40215* (2013.01); *H04L 2012/40234* (2013.01); *H04L 2012/40273* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | |
|---|---|---|---|
| 2005/0169401 A1* | 8/2005 | Abraham | H04B 3/54 375/295 |
| 2007/0286225 A1 | 12/2007 | Enders et al. | |
| 2008/0042802 A1* | 2/2008 | Shaffer | G07C 5/008 340/7.2 |

OTHER PUBLICATIONS

Arabia, E.; Ciofi, C.; Consoli, A.; Merlino, R. and Testa A., Electromechanical Actuators for Automotive Applications Exploiting Power Line Communication, Proceedings of SPEEDAM, pp. 909-914, May 26-26, 2006.*

Barmada, S.; Raugi, M.; Tucchi, M. and Zheng, T., Powerline communication in a full electric vehicle, Proceedings of IEEE International Symposium on Power Line Communications and Its Applications, pp. 331-336, Rio de Janeiro, Mar. 28-31, 2010.*

De Caro S. & Testa, A., A Power Line Communication approach for body electronics modules, Proceeding of Power Electronics and Applications, pp. 1-10, Sep. 10, 2009.*

"PLC—Stamp 1 Preliminary Datasheet", I2SE GMBH, Oct. 21, 2013, 14 pages. Retrieved from the Internet: URL: http://www.i2se.com/wiki/lib/exe/fetch.php?media=wiki:downloads:plc-stamp_1_datasheet_r5_low_resolution.pdf.

HomePlug Green PHY™ 1.1, "The Standard for In-Home Smart Grid Powerline Communications: An Application and technology overview", HomePlug Powerline Alliance, Inc., Version 1.02, Oct. 3, 2012, 18 pages. Retrieved from the Internet: http://www.homeplug.org/media/filer_public/92/3f/923f0eb3-3d17-4b10-ac75-03c3c2855879/homeplug_green_phy_whitepaper_121003.pdf.

Beikirch et al., "Powerline Communications Interface in CSMA/CA-Networks", Emerging Technologies and Factory Automation, vol. 2, 2003, pp. 117-120. IEEE Conference Sep. 16-19, 2003.

Extended European Search Report from EP Application No. 15153382.5, Apr. 24, 2015.

Great Britain Search Report from Application No. GB1401643.0, Jun. 12, 2014.

* cited by examiner

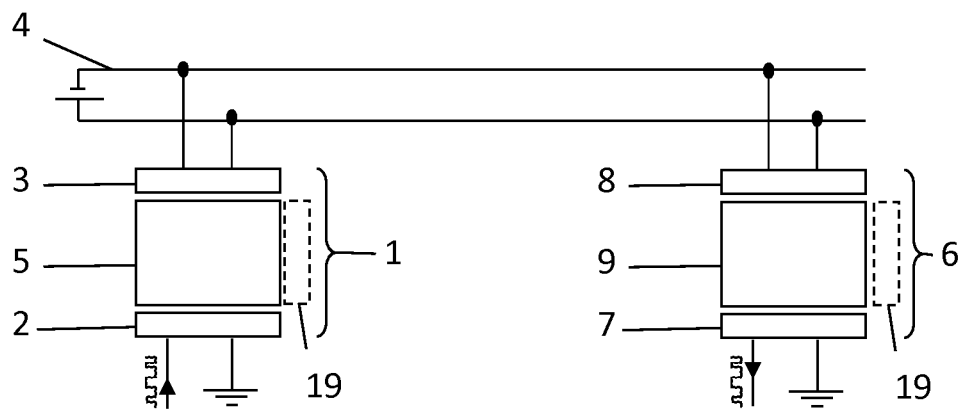
FIG. 1
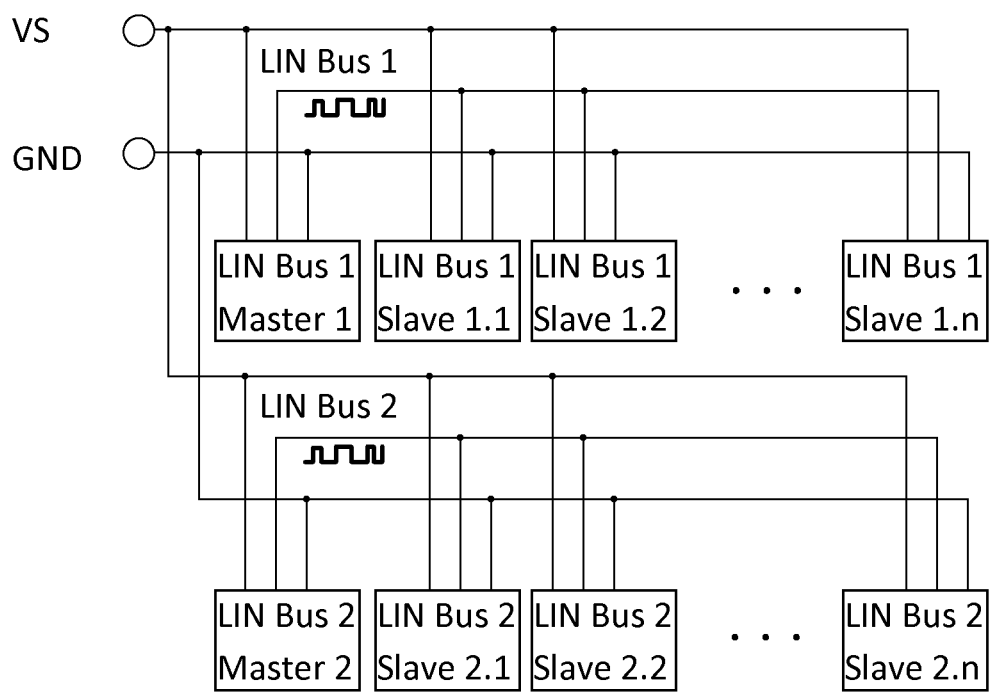
FIG. 2 – PRIOR ART

POWER SUPPLY LINE DATA TRANSMISSION

FIELD OF THE INVENTION

The present invention relates to the field of data transmission networks. More specifically it relates to a transmitter, a receiver and a method for data communication over a power supply line, e.g. an automotive power supply line.

BACKGROUND OF THE INVENTION

The invention relates to data transfer, such as Local Interconnect Network (LIN) data communication, via a power supply line, e.g. an automotive power supply backbone. For example, LIN may be advantageously combined with a Power Line Communication (PLC) modem in order to avoid the need for additional signaling wires, e.g. a PLC approach may enable existing power cables to provide the physical layer for standard automotive communication protocols, or may act as a low-cost backup physical layer to critical communication lines.

While data transfer over household power distribution lines is also known in the art, higher requirements on the robustness, e.g. in terms of Quality of Service, exist in automotive environments than in domestic use. For example, if an end user turns on a power tool or other heavy inductive loads connected to the power network, e.g. in an adjacent room, it may not be uncommon for a powerline local area network (LAN) to temporarily loose connection or at least drop some data packages. While this may be considered as a normal result of the spike in power use, or at least not as unexpected under these conditions, in a vehicle, e.g. a car, a data connection failure, even temporarily, could have severe consequences. For example, vehicle safety could be compromised. Furthermore, even if an automotive data communication error is not directly a risk to vehicle safety, from a user point of view it would be seen as very unpleasant, if, for example, a window lifter would not be operational in case the wipers are active.

Furthermore, an automotive powerline net may typically be a low voltage direct current net, e.g. a 12 V DC net, while domestic power distribution may typically relate to higher voltages and alternating current, e.g. 230V AC as common in Europe. The automotive power supply is routed in parallel to many other signal lines, e.g. real-time buses such as a CAN bus, a LIN bus, an Ethernet network and/or others. The automotive harness in its complexity may thus relate to a more dense and noisy environment than a domestic power grid. This implies also that an automotive supply can have huge fluctuations in its transfer function, e.g. in its frequency response.

International patent application WO 2009/036834 discloses a related method for data communication in a vehicle which takes place exclusively by means of a supply line structure. A transceiver transmits bits via the supply line structure, and all higher tasks defined in the open systems interconnection (OSI) reference model of the International Organization for Standardization are performed by a microprocessor or microcontroller. For example, LIN or controller area network (CAN) data may be encapsulated via the OSI layer model and transmitted over the power line.

SUMMARY OF THE INVENTION

It is an object of embodiments of the present invention to provide simple and robust data transfer via a power supply line, e.g. via an automotive power supply line in a vehicle.

The above objective is accomplished by a method and device according to embodiments of the present invention.

It is an advantage of embodiments of the present invention that robust data communication can be achieved over an automotive power line, e.g. over a low voltage direct current net used in vehicles, such as a 12 V DC net. For example, connection loss or data packet loss may be avoided in the dense and noisy environment of an automotive power supply network. It is an advantage of embodiments that reliable data communication can be achieved over an automotive power supply that may be subject to large fluctuations in its transfer function, e.g. by distributing the transmitted data over a relatively large bandwidth relative to the bandwidth of the communication signal itself.

In a first aspect, the present invention relates to a transmitter for transmitting data over an automotive power supply line. The transmitter comprises a local signal port for receiving a serial bit stream, a power line connection port for transmitting a radio frequency signal over a power supply line, and a modulator unit for emitting the radio frequency signal. The modulator unit is adapted for encoding the serial bit stream into a baseband signal and generating the radio frequency signal by mixing the baseband signal with a carrier wave so as to redundantly convey the baseband signal in at least four spectral sidebands of the carrier wave.

In embodiments of the present invention, the local signal port may be adapted for receiving the serial bit stream from an automotive sensor, an automotive actuator or an automotive high-level controller. The power line connection port may furthermore be adapted for transmitting the radio frequency signal over an automotive power supply line.

In embodiments of the present invention, the local signal port may comprise a local interconnect network bus connection for connecting to at least one local LIN-compatible device.

In embodiments of the present invention, the modulator unit may furthermore be adapted for encoding the serial bit stream using for example AM, FM, QPSK, FSK, MSK, ASK or similar techniques, or a combination of such techniques.

In embodiments of the present invention, the modulator unit may be adapted for generating the carrier wave, in which the carrier wave has a predetermined frequency in the range of 22 MHz to 30 MHz.

In embodiments of the present invention, the modulator unit may furthermore be adapted for generating the radio frequency signal such that the frequency spectrum of each of the at least four spectral sidebands is separated by at least 1 MHz from the frequency spectra of each other spectral sideband of the at least four spectral sidebands.

In embodiments of the present invention, the modulator unit may be adapted for shifting the baseband signal conveyed in at least one of said at least four spectral sidebands over a predetermined time delay relative to the baseband signal conveyed in at least one other of said at least four spectral sidebands.

In embodiments of the present invention, the local signal port may be adapted for receiving at least two serial bit streams, and the modulator unit may be adapted for encoding each of the at least two serial bit streams into a corresponding baseband signal.

In embodiments of the present invention, the modulator unit may comprise at least one digital mixing stage for frequency shifting and combining the base band signals corresponding to the at least two serial bit streams.

A transmitter according to embodiments of the present invention may further comprise a configuration unit for configuring the redundancy level provided by the transmitter so as to selectively route at least one of the at least two serial bit streams to at least one of the at least four spectral sidebands of the carrier wave.

The present invention further relates to a receiver for receiving data transmitted over an automotive power supply line. The receiver comprises a local signal port for transmitting a serial bit stream, a power line connection port for receiving a radio frequency signal conducted over a power supply line, and a demodulator unit for processing the radio frequency signal. The demodulator unit is adapted for detecting at least four spectral sidebands of a carrier wave in the radio frequency signal, isolating a baseband signal from the at least four spectral sidebands of the carrier wave redundantly conveying the baseband signal, and decoding the baseband signal into the serial bit stream.

In a receiver according to embodiments of the present invention, the demodulator unit may be adapted for shifting the baseband signal isolated from at least one of said at least four spectral sidebands over a predetermined time delay relative to the baseband signal isolated from at least one other of said at least four spectral sidebands.

In a further aspect, the present invention also relates to a modem for transmitting and receiving data over a power supply line. The modem comprises a transmitter according to embodiments of the present invention and a receiver according to embodiments of the present invention.

In a further aspect, the present invention also relates to a method for transferring data over an automotive power supply line. The method comprises encoding an input serial bit stream into a baseband signal, generating a radio frequency signal by mixing the baseband signal with a carrier wave so as to redundantly convey the at least one baseband signal in at least four spectral sidebands of the carrier wave and transmitting the radio frequency signal over a power supply line. The method also comprises receiving the radio frequency signal conducted over the power supply line, detecting the at least four spectral sidebands of the carrier wave in the radio frequency signal, isolating the baseband signal from the at least four spectral sidebands of the carrier wave, and decoding the baseband signal into an output serial bit stream.

A method according to embodiments of the present invention may comprise transferring data corresponding to a plurality of logical LIN buses isolated in different carrier frequency components transmitted over the power supply line.

In a method according to embodiments of the present invention, encoding the input serial bit stream may comprise encoding a LIN-compatible data stream.

In a method according to embodiments of the present invention, decoding the baseband signal into an output serial bit stream may comprise decoding the baseband signal into a LIN-compatible data stream.

In a method according to embodiments of the present invention, encoding of the input serial bit stream and decoding of the baseband signal into the output serial bit stream may comprise respectively encoding and decoding using for example AM, FM, QPSK, FSK, MSK or similar techniques, or a combination of such techniques.

In a method according to embodiments of the present invention, the generating of the radio frequency signal and the detecting at least four spectral sidebands of the carrier wave may comprise respectively generating and detecting the at least four spectral sidebands of the carrier wave having a predetermined frequency in the range of 22 MHz to 30 MHz.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1 illustrates a transmitter and a receiver according to embodiments of the present invention.

FIG. 2 illustrates a prior-art system for LIN communication.

Figure 3:
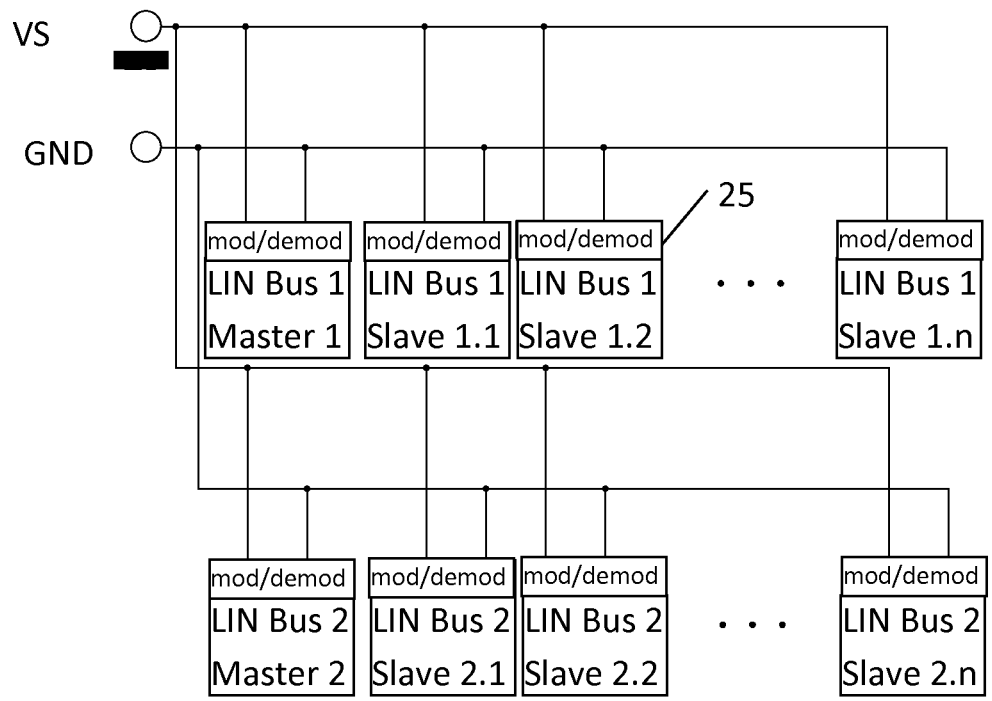
FIG. 3 illustrates a network architecture in accordance with embodiments of the present invention.

In the different drawings, the same reference signs refer to the same or analogous elements. Any reference signs in the claims shall not be construed as limiting the scope.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates to data transfer, e.g. Local Interconnect Network (LIN) data transfer, via a power supply line, e.g. an automotive power supply backbone, using a power line communication (PLC) method. Thus, the need for additional signaling wires may be advantageously avoided. Furthermore, embodiments of the present invention may advantageously provide robust and redundant data transmission, which can be compliant with electromagnetic compatibility (EMC) requirements in automotive applications. Particularly, the synthesis of redundant communication channels which are spread over a wide frequency range in accordance with embodiments of the present invention can efficiently improve the robustness against electromagnetic interference. Digital sampling and synthesis techniques can be used in accordance with embodiments of the present invention to provide such redundant communication channels in a simple and efficient manner. Furthermore, multiple independent communication buses, e.g. multiple independent asynchronous LIN buses, or heterogeneous communication models, e.g. both LIN and CAN communication packets, can advantageously share frequency bands on a same wire harness, e.g. the power supply line. The level of redundancy and the number of independent channels can be easily reconfigured depending on the requirements using the same hardware in accordance with embodiments of the present invention.

In a first aspect, the present invention relates to a transmitter for transmitting data over a power supply line. The transmitter comprises a local signal port for receiving a serial bit stream, a power line connection port for transmitting a radio frequency signal over a power supply line and a modulator unit for emitting the radio frequency signal. The modulator unit is adapted for encoding the serial bit stream into a baseband signal and generating the radio frequency signal by mixing the baseband signal with a carrier wave so as to redundantly convey the baseband signal in at least four spectral sidebands of the carrier wave. Furthermore, the present invention also relates to a receiver for receiving data transmitted over the power supply line. The receiver comprises a local signal port for transmitting a serial bit stream, a power line connection port for receiving the radio frequency signal conducted over the power supply line and a demodulator unit for processing the radio frequency signal. The demodulator unit is adapted for detecting at least four spectral sidebands of a carrier wave in the radio frequency signal, isolating a baseband signal from the at least four spectral sidebands of the carrier wave redundantly conveying the baseband signal and decoding the baseband signal into the serial bit stream. Furthermore, the present invention also relates to a modem for transmitting and receiving data over the power supply line, e.g. comprising a transmitter according to embodiments of the present invention for transmitting data over the power supply and a receiver according to embodiments of the present invention for receiving data transmitted over the power supply line. For example, a Local Interconnect Network (LIN) may be provided by a modem according to the present invention locally connected to each LIN node, thus using the modem for data transfer over an automotive power supply backbone as the physical layer.

Referring to FIG. 1, a transmitter 1 for transmitting data over a power supply line 4 and a receiver 6 for receiving data transmitted over the power supply line 4 according to embodiments of the present invention are illustrated. The transmitter 1 and the receiver 6 are functionally interrelated, e.g. the transmitter and receiver are apparatuses that complement each other and may work together. For example, the transmitter and receiver may be combined into a modem for bidirectional communication.

The transmitter 1 comprises a local signal port 2 for receiving a serial bit stream. For example, the serial bit stream may conform to the LIN standard, which for example may provide a cost effective hardware solution for low level data exchange between different components in cars. The transmitter 1 also comprises a power line connection port 3 for transmitting a radio frequency signal over a power supply line 4. The local signal port 2 may be adapted for receiving a serial bit stream from an automotive sensor, actuator or high-level controller. The power line connection port 3 may be adapted for transmitting a radio frequency signal over an automotive power supply line 4

The local signal port 2 may thus comprise a LIN-bus connection for connecting to at least one local LIN-compatible device, e.g. a window lifter, an interior light source controller, a water, fuel or oil pump, a heater and/or air conditioner blower, an engine cooling fan or a higher level system. While in a conventional LIN bus system such devices may be interconnected via three wires, e.g. a power supply wire, a ground wire and a signal wire, in embodiments according to the present invention, such connections need only be present to convey the signal to the local transmitter or receiver. Furthermore, the transmitter 1 can be integrated with a device providing the serial bit stream, e.g. can be packaged together with the device in a compact housing or the transmitter 1 and the device may be implemented on a single printed circuit board or in an integrated circuit.

Therefore, a complex wiring network, possibly comprising wires for a plurality of independent LIN buses, can be avoided by embodiments of the present invention. A system as may be known in the art for LIN communication is illustrated in FIG. 2, comprising a complex wiring network interconnected via a power supply wire VS, a ground wire GND, and a signal line LIN Bus 1, Lin Bus 2 per LIN controller Master 1, Master 2. Compared thereto, FIG. 3 illustrates a network architecture in accordance with embodiments of the present invention, equivalent to the conventional layout shown in FIG. 2. Costs, raw materials and weight can be reduced with respect to the conventional layout by removing the LIN wires and interconnects and by modulating the LIN protocol on the supply line using transmitters and receivers Mod/Demod in accordance with embodiments of the present invention. The existing power bus can be efficiently used as the physical media for the data exchange, thus providing a less complex wire harness system, which in automotive applications may reduce the weight of a vehicle and therefore may also reduce carbon dioxide emissions.

Where in the conventional layout shown in FIG. 2, different LIN buses are isolated by using mutually isolated LIN signal wires LIN Bus 1, LIN Bus 2, in embodiments of the present invention, different logical LIN buses, and thus also the LIN master devices of these LIN buses, may be interconnected via a shared power supply line. While it is not allowed to have several LIN masters on one LIN network according to the LIN protocol specification, the present invention can provide means and methods for encapsulating the LIN bus communication in radio frequency communication over a shared transmission medium. Furthermore, an easy implementation on system level, redundancy against disturbances and compliance towards existing radio communication standards and electromagnetic impurity can be achieved in addition to the efficient handling, interconnection and separation of several LIN buses in an automotive environment.

The transmitter 1 also comprises a modulator unit 5 for emitting the radio frequency signal. The modulator unit 5 is adapted for encoding the serial bit stream, e.g. the serial bit stream received via the local signal port 2, into a baseband signal.

The modulator unit 5 may implement a simple analog modulation technique, such as amplitude modulation (AM), frequency modulation (FM) or phase modulation (PM). In AM, the instantaneous value of the amplitude of a carrier signal is varied in proportion to the amplitude variations of the serial bit stream signal (modulating signal). In FM, the amplitude of the carrier is kept constant while its frequency is varied in accordance with the amplitude variations of the serial bit stream signal. However, the modulator unit 5 may also implement a digital modulation technique, such as amplitude shift keying (ASK), frequency shift keying (FSK), minimum shift keying (MSK), or more complex techniques like quadrature phase shift keying (QPSK), or quadrature amplitude modulation (QAM), all known per se by a person skilled in the art. Although amplitude and phase can be modulated simultaneously, it may be advantageous to separate the signal into two orthogonal components, an in-phase component I and a quadrature component Q. In an I/Q modulator, the I and Q signals are mixed with a shared local oscillator (LO), while a 90 degree phase shifter is placed in one of the local oscillator paths and summed to a composite output signal. The modulator unit 5 may thus be adapted for encoding the serial bit stream using AM, FM, QPSK, MSK, FSK, ASK or combinations of such techniques. In a particular embodiment, the modulator unit 5 may be adapted for encoding the serial bit stream using minimum-shift keying (MSK). MSK is a type of continuous-phase frequency-shift keying that is encoded with bits alternating between quadrature components, with the Q component delayed by half the symbol period. Each bit is encoded as a half sinusoid, resulting in a constant-modulus signal, which advantageously reduces the effects of non-linear distortion. Furthermore, the difference between the higher and lower frequency is equal to half the bit rate, such that a low modulation index of 0.5 can be achieved while preserving orthogonality of the 0 and 1 waveforms. For example, the modulator unit 5 may be adapted for encoding the serial bit stream using minimum-shift keying into a baseband signal having a bandwidth of 100 kHz or lower, for example into a 30 kHz baseband signal for a 20 kbps serial bit stream signal. Thus, for a 30 kHz signal, a sufficient margin for frequency tolerances of 70 kHz may be maintained while only requiring a small 100 kHz band separation.

Embodiments of the present invention may advantageously provide a high information capacity, a good data security, a good quality communication, and/or a good system availability. The modulation may also take the available bandwidth, power requirements, and inherent noise levels of the transmission system into account. Digital modulation schemes may for example have a larger capacity to convey large amounts of data than analog modulation schemes. Although a fundamental trade-off may exist in digital modulation technology between simple hardware designs using a relative large spectral bandwidth and complex hardware designs using a smaller spectral bandwidth for transmitting the same amount of data, embodiments of the present invention may comprise a relatively simple modulator unit while still allowing robust data communication over a noisy power line.

The modulator unit 5 is also adapted for generating the radio frequency signal, e.g. the radio frequency signal for transmitting over the power supply line 4 via the power line connection port 3, by mixing the baseband signal with a carrier wave so as to redundantly convey the at least one baseband signal in at least four spectral sidebands of the carrier wave, e.g. in four spectral sidebands of the carrier wave. The modulator unit 5 may be adapted for generating the carrier wave having a predetermined frequency $f_{LO1}$ in the range of 22 MHz to 30 MHz, for example preferably in the range of 24 MHz to 28 MHz, or even more preferred in the range of 25 MHz to 27 MHz. The modulator unit 5 may comprise a local oscillator, e.g. an electronic oscillator, such as a crystal oscillator, for generating the carrier wave for converting the baseband signal to a different frequency spectrum, e.g. the at least four spectral sidebands of the carrier wave. The local oscillator may be adapted to oscillate at this predetermined frequency in the range of 22 MHz to 30 MHz.

The modulator unit 5 may have a configurable carrier wave frequency $f_{LO1}$ selectable from a set of frequencies, e.g. the set having a lowest frequency of 25.4 MHz and comprising 0.1 MHz increments up to 26.8 MHz. This configuration may comprise replacing the local oscillator, e.g. a crystal oscillator, by a local oscillator of the desired frequency. Thus, a plurality of independent channels can be transmitted over the same physical medium, e.g. the power supply line. Although the carrier wave frequencies can be relatively densely spaced, e.g. may be separated by only 0.1 MHz from an adjacent spectral band of another channel corresponding to a different frequency from the set of frequencies, the at least four spectral sidebands of a single carrier wave of may be spaced relatively far from each other, e.g. by at least 4.5 MHz, in order to provide a good signal redundancy.

For example, the data transmission may take place over an existing power bus system of a car, e.g. without requiring substantial redesign of the power bus system. In such system, the transmitted frequency spectrum may be constrained in the 22 MHz to 30 MHz range to make good use of the available frequency range and the allowed power level. Furthermore, this range is selected advantageously in the light of spurious emissions in such systems. For example, interfere with existing bands used by other car applications such as FM radio, e.g. between 87.5 MHz and 108 MHz, may be avoided.

Figure 4:
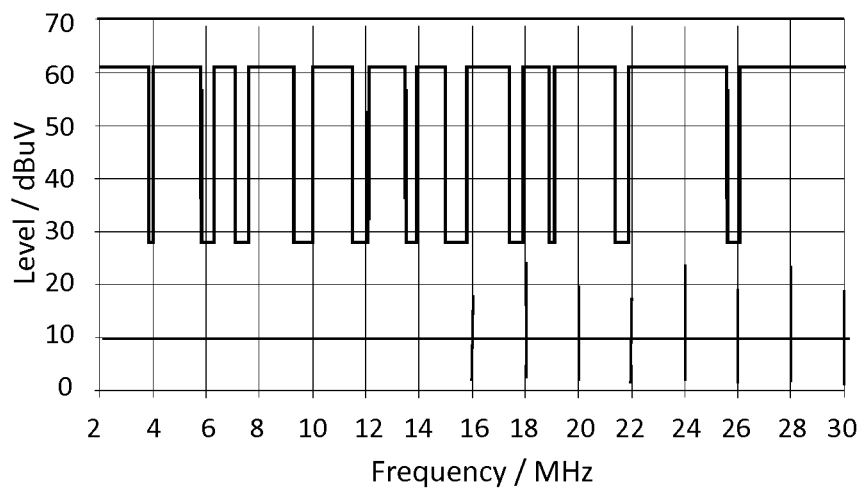
FIG. 4 shows the emission requirements related to electro-magnetic compatibility for a power net of a car for illustrating aspects of the present invention.

For example, EMC emission requirements in an automotive system for the 2 MHz to 30 MHz range are illustrated in FIG. 4. In order to obtain compliance related to electromagnetic compatibility (EMC) requirements, the emission requirements for the power net of a car shown in FIG. 4 demonstrate that a reasonable frequency range for the communication over the power net may be found from 10 MHz to 30 MHz. As can be seen in FIG. 4, below 10 MHz, only a few narrow ranges may be suitable for transmission over the power net. In the range of 10 MHz to 30 MHz, several sub-bands are used for short wave broadcasting, e.g. which are preferably not disturbed. Thus, a good range for the communication may be between 22 and 30 MHz, which is only interrupted by the 11 m band. The 22 MHz to 30 MHz band thus offers a wide range in which relatively few interference may be found. Nevertheless, other frequency bands may also be suitable for use in embodiments of the present invention.

The serial bit stream may not be provided in accordance with a complex error detection and/or correction protocol. For example, LIN communication is UART based and does not include error detection or correction. Therefore, embodiments of the present invention advantageously provide data redundancy to preserve the link quality in the presence of in-band interference and notches in the transfer characteristic of the power supply line. This is achieved by spreading the signal energy over a wide bandwidth. In embodiments of the present invention, the modulator unit 5 is adapted for mixing the baseband signal with a carrier wave so as to redundantly convey the at least one baseband signal in at least four spectral sidebands of the carrier wave. Thus, the signal energy may be spread over a wide bandwidth by using multiple channels in parallel. Although the signal energy could be spread by other methods, e.g. by DSSS or FHSS, such modern signal spreading approaches come at a high cost. For example, the effort to equip the existing UART signalling scheme of the LIN communication with DSSS or FHSS may be substantial.

Figure 5:
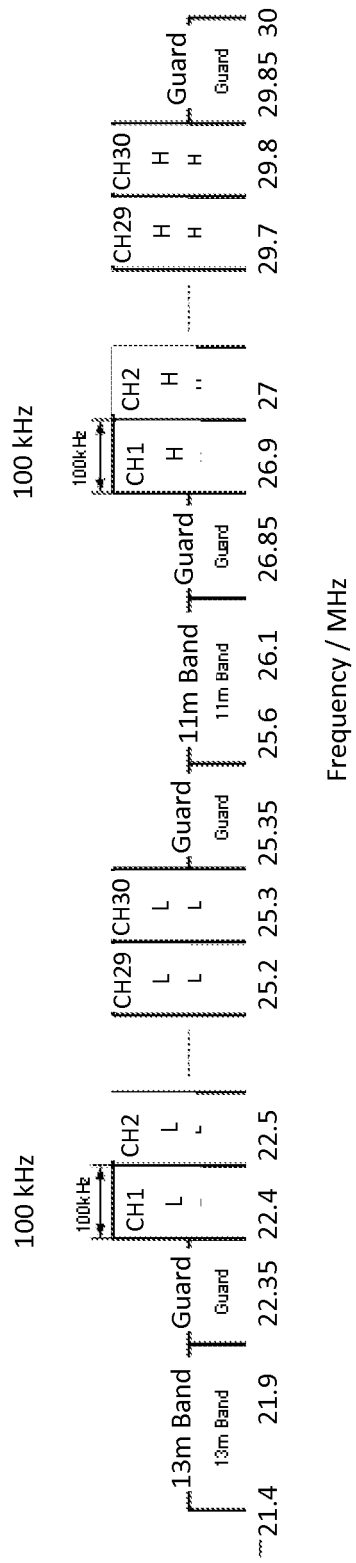
FIG. 5 shows an exemplary radio-frequency channel layout for use in embodiments of the present invention.

For example, the available range between 22 MHz and 30 MHz may be divided into a lower and an upper band around the 11 m short wave band. Each sub-band may thus for example contain up to 30 channels of 100 kHz bandwidth, which may provide an ample margin for a MSK modulated baseband signal of 30 kHz for a 20 kbps serial bit stream signal, e.g. to avoid power leaking into the restricted short wave bands a guard range is applied. FIG. 5 shows a corresponding exemplary channel layout. In this example, up to four channels may be provided in parallel per selectable carrier wave frequency, in an easily implementable scheme as will be described hereinbelow.

For example, up to four channels may be assigned to a single serial bit stream, e.g. one individual LIN bus, for redundancy. Thus, with this exemplary channel layout, 15 LIN buses can operate in parallel. In the table below, the corresponding channel assignment is shown. The corresponding channels between low and high band may be separated by 4.5 MHz while the separation between the two channels in the same band is 1.5 MHz. In this way the available frequency range may be used efficiently while the required hardware can be implemented relatively easy. On the other hand the large frequency separation provides robustness against notches in the transfer function of the supply bus and electromagnetic interferences.

| BUS No. | Channels | Channel frequencies/MHz | | | | $f_{LO1}$/MHz |
|---|---|---|---|---|---|---|
| 1 | 1L, 16L, 1H, 16H | 2.4 | 3.9 | 6.9 | 8.4 | 25.4 |
| 2 | 2L, 17L, 2H, 17H | 2.5 | 4.0 | 7.0 | 8.5 | 25.5 |
| 3 | 3L, 18L, 3H, 18H | 2.6 | 4.1 | 7.1 | 8.6 | 25.6 |
| 4 | 4L, 19L, 4H, 19H | 2.7 | 4.2 | 7.2 | 8.7 | 25.7 |
| 5 | 5L, 20L, 5H, 20H | 2.8 | 4.3 | 7.3 | 8.8 | 25.8 |
| 6 | 6L, 21L, 6H, 21H | 2.9 | 4.4 | 7.4 | 8.9 | 25.9 |
| 7 | 7L, 22L, 7H, 22H | 3.0 | 4.5 | 7.5 | 9.0 | 26.0 |
| 8 | 8L, 23L, 8H, 23H | 3.1 | 4.6 | 7.6 | 9.1 | 26.1 |
| 9 | 9L, 24L, 9H, 24H | 3.2 | 4.7 | 7.7 | 9.2 | 26.2 |
| 10 | 10L, 25L, 10H, 25H | 3.3 | 4.8 | 7.8 | 9.3 | 26.3 |
| 11 | 11L, 26L, 11H, 26H | 3.4 | 4.9 | 7.9 | 9.4 | 26.4 |
| 12 | 12L, 27L, 12H, 27H | 3.5 | 5.0 | 8.0 | 9.5 | 26.5 |
| 13 | 13L, 28L, 13H, 28H | 3.6 | 5.1 | 8.1 | 9.6 | 26.6 |
| 14 | 14L, 29L, 14H, 29H | 3.7 | 5.2 | 8.2 | 9.7 | 26.7 |
| 15 | 15L, 30L, 15H, 30H | 3.8 | 5.3 | 8.3 | 9.8 | 26.8 |

The modulator unit 5 may be adapted for generating the radio frequency signal such that the frequency spectrum of each of the at least four spectral sidebands is separated by at least 1 MHz, e.g. by at least 1.5 MHz, from the frequency spectra of each other spectral sideband of the at least four spectral sidebands.

A high frequency separation relative to the data rate, and thus the occupied signal bandwidth, in accordance with embodiments of the present invention may be particularly advantageous in a noisy environment such as encountered in automotive applications. For example, assuming a NRZ encoding scheme, the signal frequency may be e.g. 20 kHz (e.g. 20 kbps), while the signal separation may be at least 1 MHz, thus resulting in a frequency separation to data signal bandwidth factor of e.g. at least 50. For example, known methods for redundant data communication over power supply lines, e.g. in domestic power net communication, may rely on much lower separation to signal bandwidth factors, e.g. a factor of 2.5 MHz/1.25 MHz=2.

The local signal port 2 may be adapted for receiving at least two serial bit streams, for example for receiving at least four serial bit streams, e.g. a number of serial bit streams corresponding to the number of at least four spectral sidebands may be received via parallel signal lines. The modulator unit 5 may be adapted for encoding each of the at least two serial bit streams into a corresponding baseband signal. The modulator unit 5 may comprise at least one digital mixing stage for frequency shifting and combining the base band signals corresponding to the at least two serial bit streams.

It is furthermore an advantage of embodiments of the present invention that at least two asynchronous serial bit streams can be transmitted over the same power supply line. A single node may transmit/receive multiple asynchronous streams redundantly, and moreover, different nodes can be configured to each transmit/receive at least one stream redundantly that is asynchronous to other streams transmitted over the power line. Thus, multiple nodes may asynchronously transmit data at the same time. For example, in an exemplary embodiment of the present invention, a plurality of LIN buses, e.g. 15 LIN buses, can reliably communicate asynchronously over the same power supply line, e.g. each bus may be configured to use 4 channels out of 60 available channels, for example, in which the 4 channels may have a predefined frequency separation, e.g. preferably a predefined large frequency separation as discussed hereinabove.

The transmitter may further comprise a configuration unit 19 for configuring the redundancy level provided by the transmitter so as to selectively route at least one of the at least two serial bit streams to at least one of the four spectral sidebands of the carrier wave.

Figure 6:
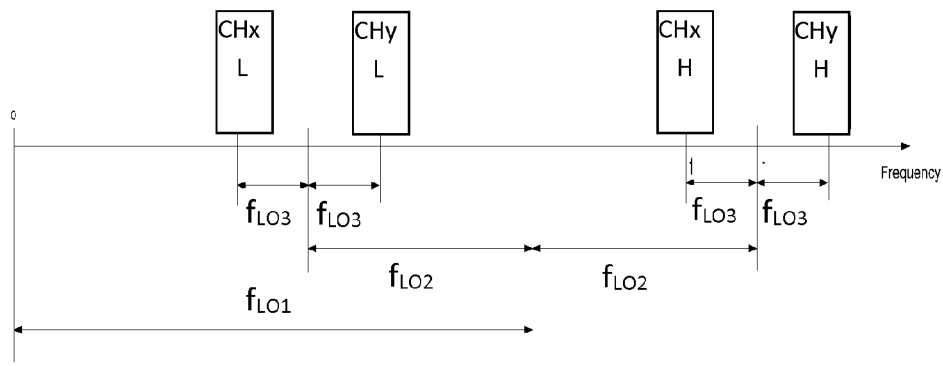
FIG. 6 shows an exemplary three-stage approach for synthesizing transmission sidebands in accordance with embodiments of the present invention.

An efficient three-stage approach for use in a device according to embodiments of the present invention is shown in FIG. 6. This simple scheme is suitable for synthesizing each individual side-band independently by using complex signal processing hardware. The communication is redundantly spread over a range of $2(f_{LO2}+f_{LO3})$. While these local oscillator frequencies may be fixed, the carrier wave frequency $f_{LO1}$ may vary on the relevant channel grid. As in the example discussed hereinabove, this channel grid may have a granularity of 100 kHz. With this approach, redundant communication channels may be advantageously synthesized. The redundant communication channels may be spread over a wide frequency range to improve the robustness against EM interference. Also, multiple independent and asynchronous bit streams, e.g. for a plurality of LIN buses, may be carried using the same frequency band on the same wire harness. Furthermore, it is possible to choose and adapt the level of redundancy to the actual requirements, e.g. depending on the implementation, any configuration between having four redundant channels and having four completely independent channels without redundancy can be selected using the same hardware.

Figure 7:
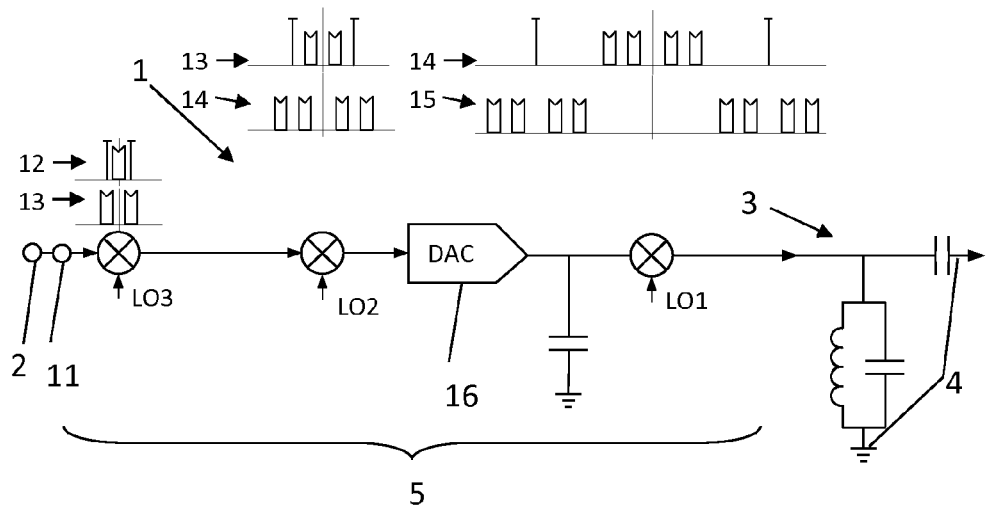
FIG. 7 shows a transmitter according to an exemplary embodiment of the present invention.

A transmitter 1 according to an exemplary embodiment of the present invention is illustrated in FIG. 7, corresponding to a conversion scheme for an AM modulated baseband. The radio frequency signal is generated by the modulator unit 5 using three frequency conversion steps, illustrated in FIG. 6. This allows assigning up to four channels for a serial bit stream, e.g. each independent LIN bus. The frequency separation between the two corresponding channels CH×L and CH×H between low and high band is $2f_{LO2}$. The modulator unit 5 receives the serial bit stream from a local signal port 2. The modulator unit 5 may comprise an AM signal conditioner 11 for encoding the serial bit stream into an AM modulated baseband signal. The first conversion step may be done by mixing the baseband signal with a local oscillator LO3, e.g. the modulator unit 5 may comprise a first mixer, e.g. an electronic frequency mixer, and a first local oscillator LO3 for generating an intermediate output signal 13 comprising two heterodynes of the baseband signal. The local oscillator LO3 may generate an oscillatory signal, e.g. a cosine wave such as $\cos(\omega_{LO3}t)$, where t indicates time and $\omega_{LO3}=2\pi f_{LO3}$ the angular frequency of the wave. As a result, the baseband spectrum is shifted to $-f_{LO3}$ and $f_{LO3}$. The input signal 12 and output signal 13 of the local oscillator LO3 mixing step are also illustrated in FIG. 7. In a second conversion step, the generated first mixing products are further multiplied, e.g. by a second mixer, with an oscillation generated by a second local oscillator LO2 of frequency $f_{LO2}$ to establish a negative and a positive sideband wherein the corresponding channels are separated by $2f_{LO2}$. The second local oscillator LO2 may generate an oscillatory signal, e.g. a cosine wave such as $\cos(\omega_{LO2}t)$ having an angular frequency $\omega_{LO2}=2\pi f_{LO2}$. Consequently four side-bands around the direct current component (DC) will be generated as illustrated by the output signal 14 of the local oscillator LO2 mixing step. It should be noted that reference is made herein to the mathematical frequency spectra, which contain positive and negative components of the same frequency, in order to illustrate the effects of the frequency conversion scheme.

In a third conversion step, the radio frequency signal is generated by mixing the generated redundant channels with a carrier wave so as to redundantly convey the at least one baseband signal in at least four spectral sidebands of the carrier wave. The generated redundant channels in the intermediate output signal 14 are converted to the corresponding sideband frequencies illustrated by the radio frequency signal 15 by mixing with the local oscillator LO1, having a frequency $f_{LO1}$ which can be selected to address the individual channel frequencies as discussed hereinabove. The local oscillator LO1 may generate an oscillatory signal, e.g. a cosine wave such as $\cos(\omega_{LO1}t)$ having an angular frequency $\omega_{LO1}=2\pi f_{LO1}$. For example, the modulator unit 5 may comprise a phase locked loop (PLL) synthesizer for providing the carrier wave, e.g. the local oscillator LO1 may be derived from a PLL synthesizer. The PLL synthesizer may have a minimum granularity equal to the channel separation, e.g. 100 kHz in the example discussed hereinabove.

It shall be clear to the person skilled in the art that the modulator unit 5, in this exemplary embodiment or other embodiments, may comprise at least one further local oscillator LO4, . . . , LOn in order to redundantly convey the at least one baseband signal in respectively $2^{(4-1)}, \ldots, 2^{(n-1)}$ spectral sidebands of the carrier wave.

In embodiments of the present invention the up-conversion may be performed in the digital domain, e.g. in the LO2 domain with a sampling speed of $f_{s2}=4f_{LO2}$ and in the LO3 domain with a sampling speed of $f_{s3}=4f_{LO3}$. With the over-sampling of the local oscillator frequency by four, a sinusoidal waveform of the local oscillator may be reduced to a sequence of [0 1 0 −1] which can simplify the hardware and therefore the conversion effort. However, the final up-conversion stage, in the LO1 domain, may be performed in the analog domain in order to avoid or reduce the spurious leakage and power consumption. This is illustrated by the digital-to-analog converter 16 for converting the digital signal provided by the LO2 mixing step to the analog domain.

Figure 8:
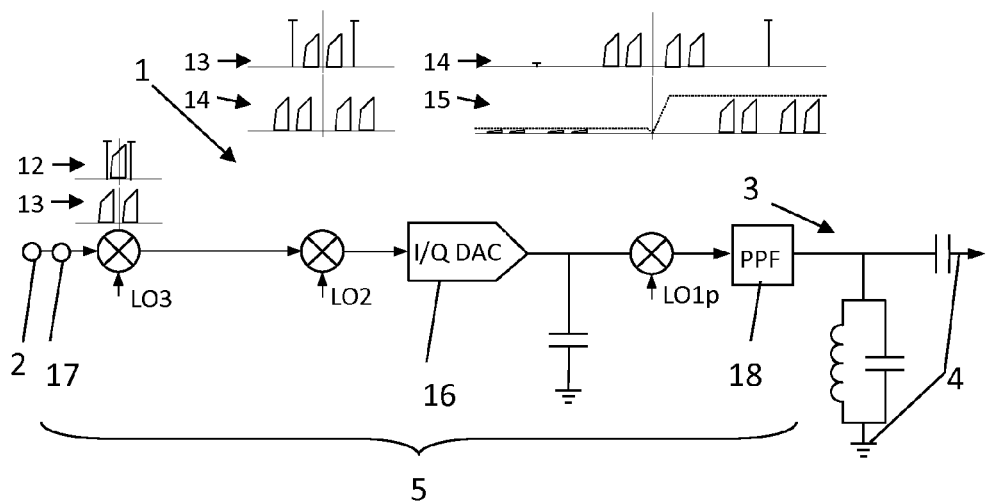
FIG. 8 shows a transmitter according to another exemplary embodiment of the present invention.

A transmitter 1 according to another exemplary embodiment of the present invention is illustrated in FIG. 8, corresponding to a conversion scheme for a FSK modulated baseband. The transmitter illustrated in FIG. 7 may be well suited for amplitude modulated AM signals, since the sidebands contain exactly the same information, thus a mirrored spectrum component can superimpose a non-mirrored component. However, this is not generally applicable. For example, the modulator unit 5 may comprise a signal baseband encoder 17, e.g. which may differ from the AM signal conditioner 11 in FIG. 7, for encoding the serial bit stream into the baseband signal, e.g. an FSK modulated baseband signal, so that negative and positive spectrum components need to be distinguished. The signal chain shown in FIG. 8 may be implemented in an orthogonal way, e.g. by separate I and Q paths. The digital-to-analog converter 16 may be adapted for converting the I and Q digital signals provided by the LO2 mixing step to the analog domain, e.g. the DAC 16 may be an I/Q DAC. The local oscillator LO3 may generate an oscillatory signal, e.g. a cosine wave such as $\cos(\omega_{LO3}t)$, where t indicates time and $\omega_{LO3}=2\pi f_{LO3}$ the angular frequency of the wave. The local oscillator LO2 may generate an oscillatory signal, e.g. a cosine wave such as $\cos(\omega_{LO2}t)$ having an angular frequency $\omega_{LO2}=2\pi f_{LO2}$.

The final up-conversion may be performed by using a quadrature up-conversion mixer which is converting the intermediate input signal by means of a one-sided local oscillator $LO_{1p}$ signal, e.g.

$$e^{j\omega_{LO_1^t}}$$

having an angular frequency $\omega_{LO1}=2\pi f_{LO1}$. The resulting I/Q signal may then be merged by e.g. a Poly-Phase Filter (PPF) 18 which suppresses the mirrored spectrum components before merging. If the conversion by LO1p is done in analog domain, e.g. for achieving a low power consumption, the output of LO1p may also contain residual $$e^{-j\omega_{LO_1^t}}$$

components caused by imperfections in the local oscillation generation and in the mixing due to operation in the analog domain. As a result, a residual negative frequency component can remain, which however can be sufficiently small to be well below the level of the positive component reduced by the necessary Signal-to-Noise Ratio (SNR).

Figure 9:
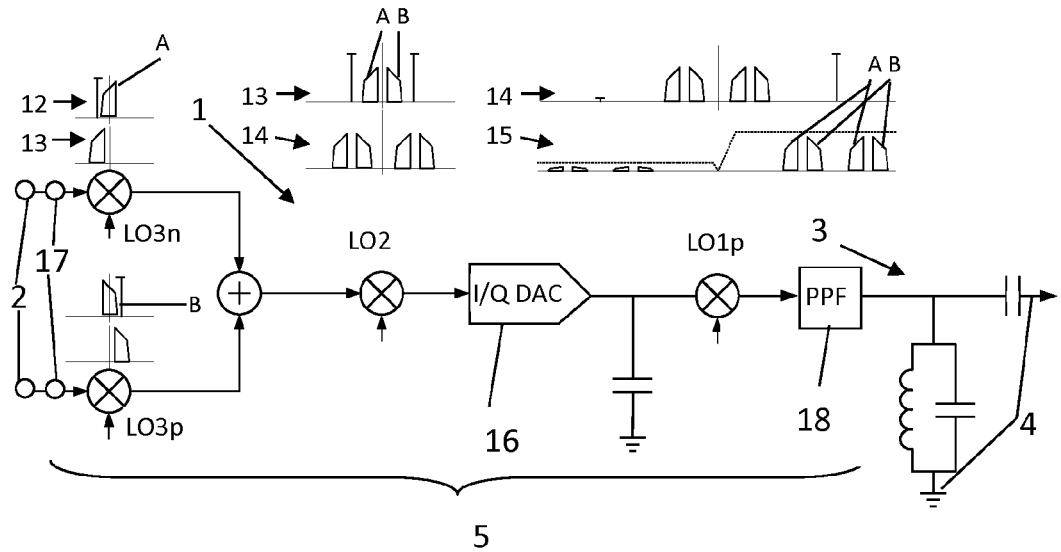
FIG. 9 shows a transmitter according to embodiments of the present invention which can be configured to transmit a pair of channels which still have one redundant channel each.
Figure 10:
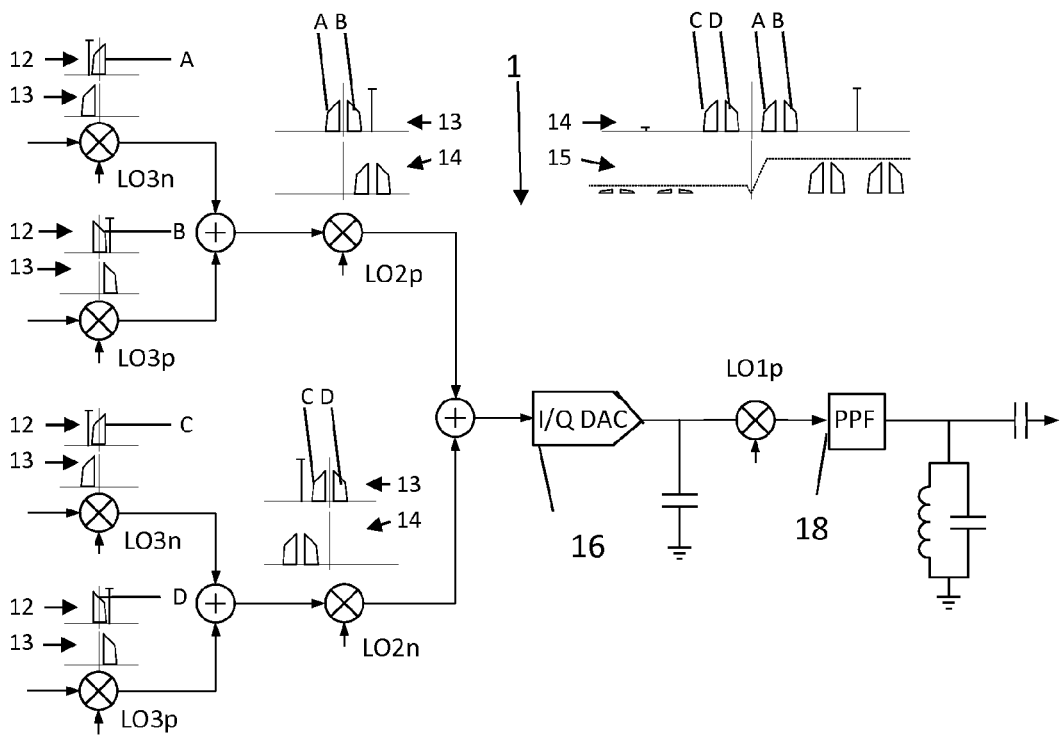
FIG. 10 shows a transmitter according to embodiments of the present invention which can be configured to transmit four independent channels, while still allowing an alternative configuration for redundant data transmission.

The synthesis of a single-side local oscillator LO signal with $f_s=4f_{LO}$ in the digital domain advantageously does not contain any residual on the oppositely signed spectrum side, because the required sine and cosine components of the LO can be generated ideally as mentioned hereinabove. Thus, more channels can be encoded with less redundancy, depending on system requirements. FIG. 9 shows two independent information sources, e.g. the local signal port 2 is adapted for receiving a plurality of serial bit streams in parallel, e.g. two serial bit stream input signals A and B, which are used to compile a pair of channels which still have one redundant channel each. Therefore, the first mixing step may be split along two paths, corresponding to the two input signals A and B, in which each signal is mixed with a signal provided by a corresponding one-sided local oscillator LO3n, LO3p, e.g. respectively providing a signal $e^{-j\omega_{LO3}t}$ and $e^{j\omega_{LO3}t}$. The mixed signals provided by these two paths may then be combined, e.g. added, and provided as input to the second mixing stage. This flexibility can be further extended so that for each of the four channels an independent information source A, B, C, D can be applied as shown in FIG. 10. In the exemplary embodiment illustrated in FIG. 10, each pair of signals (A,B) and (C,D) is mixed independently with the signal provided by the local oscillators LO3n and LO3p, similar to described hereinabove in relation to FIG. 9. For each pair of signals (A,B) and (C,D) a combined intermediate output is provided by the first mixing stage. Thus, also the second mixing step may be split along two paths, corresponding to the two input signal pairs (A,B) and (C,D), in which each intermediate output of the first mixing stage is mixed with a signal provided by a corresponding one-sided local oscillator LO2n, LO2p, e.g. respectively providing a signal $e^{-j\omega_{LO2}t}$ and $e^{j\omega_{LO2}t}$. The mixed signals provided by these two paths may then be combined, e.g. added, and provided as input to the third mixing stage. However, even in the exemplary embodiment illustrated in FIG. 10, the modulator unit 5 is still adapted for mixing the baseband signal with a carrier wave so as to redundantly convey the at least one baseband signal in at least four spectral sidebands of the carrier wave, since the same serial bit stream can be easily provided to two, three or four of the inputs. This can for example be achieved by splitting the signal to a plurality of input connections of the transmitter, or the transmitter may comprise a configuration unit for configuring the channels, e.g. routing the signal provided via one input connection to a selected plurality of channels. Such configuration unit may comprise for example dip switches, a flashable memory or a processor adapted for receiving, decoding and effecting a configuration instruction via a signal line.

Thus, it is possible to apply the same information to all four channels or even two or three, so that the decision about what have to be redundant can be taken in the upper hierarchy of the system. The main overhead for this flexibility is related to the increased number of required interpolation stages. The level of redundancy and number of independent channels may be advantageously reconfigured depending on the requirements using the same hardware.

Furthermore, in embodiments of the present invention, e.g. as described hereinabove in relation to FIG. 9 and FIG. 10, the level of robustness can be advantageously further increased by applying a time delayed copy of the same signal. In embodiments according to the present invention, the modulator unit 5 may be adapted for shifting the baseband signal conveyed in at least one of the at least four spectral sidebands over a predetermined time delay 131 relative to the baseband signal conveyed in at least one other of said at least four spectral sidebands. Furthermore, each spectral sideband signal may be time shifted relative to each other spectral sideband signal, e.g. over a small integer multiple of a predetermined time delay. Likewise, in a receiver according to embodiments of the present invention, the demodulator unit may be adapted for shifting the baseband signal isolated from at least one of said at least four spectral sidebands over a predetermined time delay relative to the baseband signal isolated from at least one other of said at least four spectral sidebands, e.g. such as to compensate for the time shift applied by the modulator unit 5 of a corresponding transmitter according to embodiments.

Figure 13:
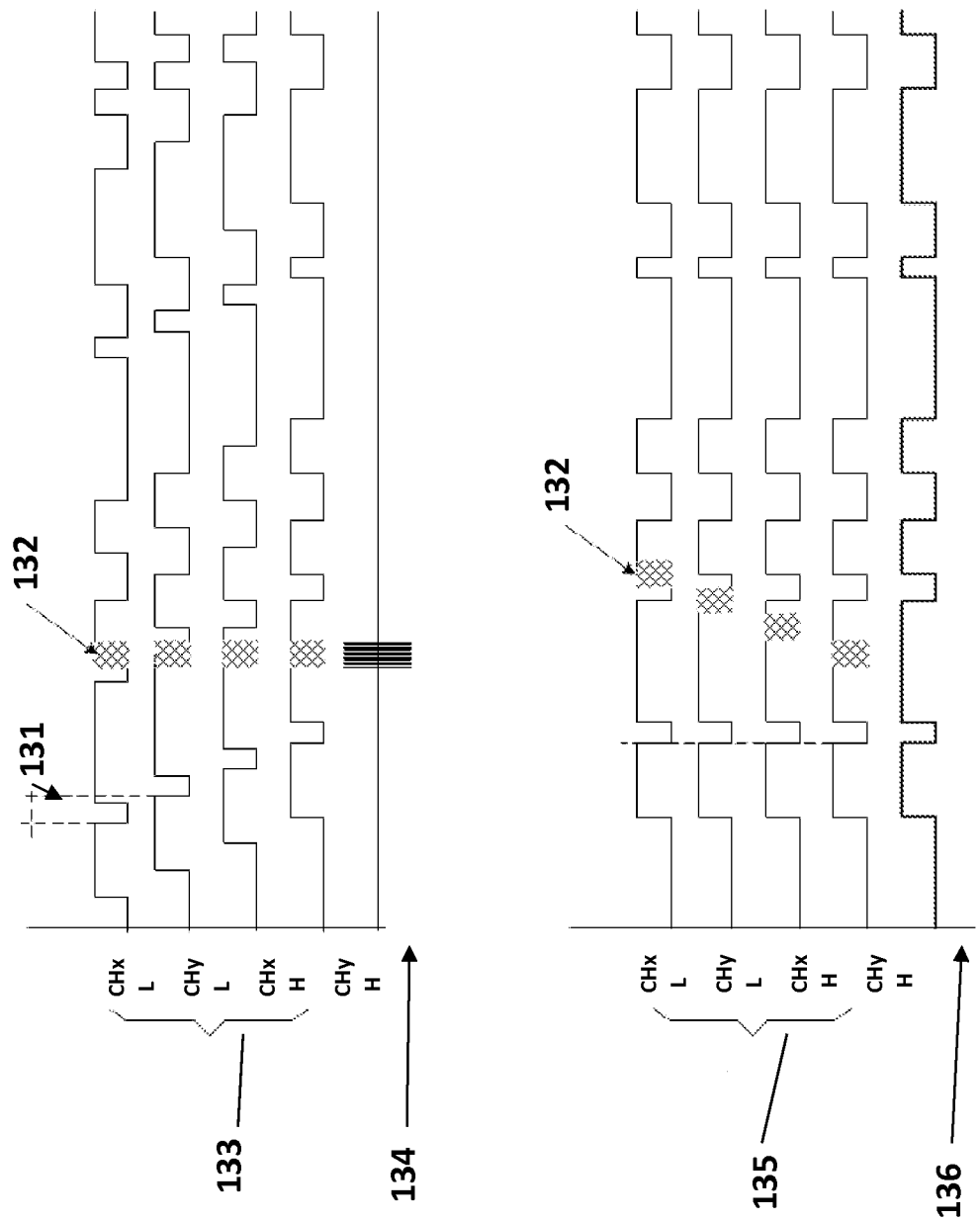
FIG. 13 illustrates embodiments of the present invention in which a predetermined relative time delay is applied between redundant signal copies.

Thus, the original bit stream at the receiver end can be reconstructed even if a short burst of interference 132 over a broad bandwidth occurs. Even though a short broadband interferer 132 may disturb all redundantly conveyed signals in the at least four spectral sidebands, a reconstruction of the signal at the receiving end may still be possible. Such interference could for example deteriorate the received signal at a specific instant in time in all redundantly transmitted channels, e.g. in four baseband signal copies in four spectral sidebands 133 transmitted over an automotive supply line 134, as shown in FIG. 13. If a delay is introduced in at least one of the transmitted redundant copies, the signal can be reconstructed by e.g. majority voting after re-timing because the delay time is known. For example, the received sidebands 135, shown at the receiver end after retiming, may contain at least one copy of the baseband signal unaffected by the disturbance, such that the reconstructed signal 136 does not suffer from information loss. The predetermined time delay may be selected as function of the duration of typical transient disturbances in the application at hand and the tolerance for near real time data transmission, e.g. an acceptable delay for data processing and control purposes may be selected that exceeds a typical duration of a transient broadband disturbance. For example, the predetermined time delay may be selected to integer multiples of the bit time, e.g. to at least 25 μs in case of a 20 kbps bit stream.

Embodiments of the present invention also relate to a receiver 6 for receiving data transmitted over the power supply line, e.g. as also schematically shown in FIG. 1. The receiver 6 comprises a local signal port 7 for transmitting at least one serial bit stream, a power line connection port 8 for receiving the radio frequency signal conducted over the power supply line 4 and a demodulator unit 9 for processing the radio frequency signal. The demodulator unit 9 is adapted for detecting at least four spectral sidebands of a carrier wave in the radio frequency signal, isolating a baseband signal from the at least four spectral sidebands, e.g. four spectral sidebands of the carrier wave redundantly conveying the baseband signal and decoding the baseband signal into the serial bit stream.

The local signal port 7 may be adapted for transmitting at least one serial bit stream to an automotive sensor, an automotive actuator or an automotive high-level controller, e.g. a LIN bus master device. The power line connection port 8 may be adapted for receiving the radio frequency signal over an automotive power supply line. The local signal port 7 may comprise a local interconnect network bus connection for connecting to at least one local LIN-compatible device.

In a receiver according to embodiments of the present invention, the demodulator unit 9 may be furthermore adapted for decoding the serial bit stream using AM, FM, QPSK, FSK, MSK, ASK or a combination of such techniques.

The demodulator unit 9 may be adapted for detecting the at least four spectral sidebands of the carrier wave in the radio frequency signal, in which the carrier wave has a predetermined frequency in the range of 22 MHz to 30 MHz.

The demodulator unit 9 may be adapted for isolating a baseband signal from the at least four spectral sidebands of the carrier wave such that the frequency spectrum of each of the at least four spectral sidebands is separated by at least 1 MHz from the frequency spectra of each other spectral sideband of the at least four spectral sidebands.

The local signal port 7 may be adapted for transmitting at least two serial bit streams, and the demodulator unit 9 may be adapted for decoding each of said at least two serial bit streams into a corresponding baseband signal. The demodulator unit 9 may comprise at least one digital mixing stage for frequency shifting and combining said base band signals corresponding to the at least two serial bit streams.

The receiver may further comprise a configuration unit 19 for configuring the redundancy level provided by the receiver so as to selectively route at least one of the at least four spectral sidebands of the carrier wave to at least one of the at least two serial bit streams.

Despite the level of redundancy, each spectral sideband is preferably down-converted independently. Furthermore, in order to overcome any non-ideality in the down-conversion process, the demodulation may be performed entirely in the digital domain. A direct conversion of the wanted band to the digital domain may be easily achievable for the frequency ranges mentioned above in relation to the receiver 1 according to embodiments of the present invention.

Figure 11:
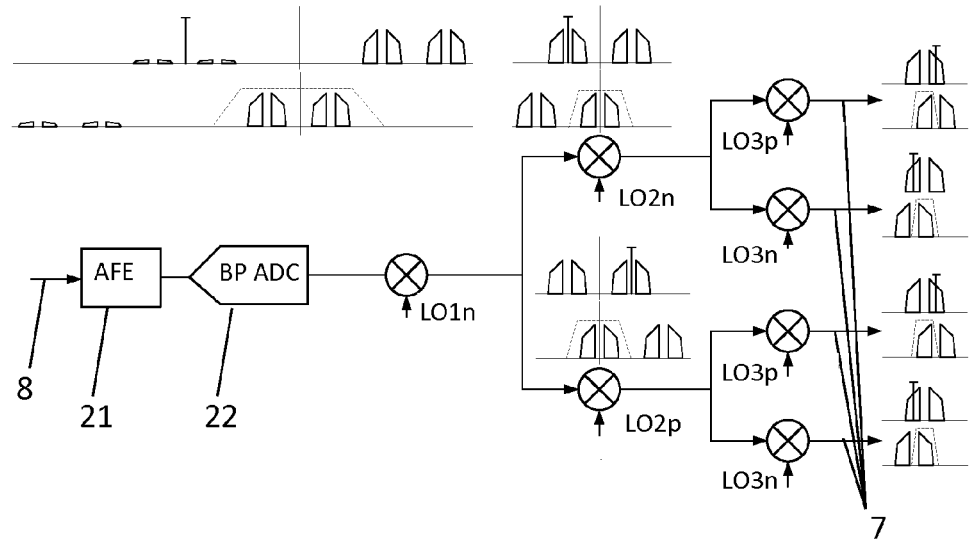
FIG. 11 shows a receiver according to an exemplary embodiment of the present invention.

The demodulator unit 9 is adapted for detecting at least four spectral sidebands of the carrier wave in the radio frequency signal, e.g. a carrier wave having a frequency corresponding to the carrier wave frequency of a corresponding transmitter 1 according to embodiments transmitting on the power line 4. Referring to FIG. 11, the power line connection port 8 may be connected to an analog front end (AFE) 21. Such AFE may be adapted for performing common analog signal processing tasks such as a band-pass filtering and/or amplification, as will be clear to the person skilled in the art. The demodulation unit 9 may comprise an analog to digital converter (ADC) 22, e.g. a band-pass ADC (BP-ADC). Detection of the at least four spectral sidebands of the carrier wave may for example be advantageously carried out by the ADC at a sampling rate of 4 $f_{LO1}$, in which the frequency $f_{LO1}$ corresponds to the carrier frequency of a corresponding transmitter, e.g. selected in the range of 25.4 MHz to 26.8 MHz, e.g. from a plurality of selectable frequencies in this range separated by a tuning grain of 100 kHz. A local oscillator LO1n may generate a one-sided oscillation $$e^{-j\omega_{LO1}^i t},$$

which translates the low band around $-f_{LO2}$ and the high band around $f_{LO2}$. Like the local oscillators in the transmitter 1 according to embodiments, all the mixing stages in the receiver 6 may also operate with a sampled rate of four times the local oscillator frequency such that the sinusoidal waveform of the related local oscillation is reduced to a sequence of [0 1 0 −1], which may advantageously simplify the hardware. Starting from the output of the local oscillator LO1n, the signal path may be split into two branches: one where the conversion is done by LO2p, e.g. providing a signal $e^{j\omega_{LO2}t}$, for converting the low band to $\pm f_{LO2}$ around DC and the other in which LO2n, e.g. providing a signal $e^{-j\omega_{LO2}t}$, converts the high band to $\pm f_{LO2}$ around DC. The frequency $f_{LO2}$ may for example be 2.25 MHz. This is shown in FIG. 11. After proper filtering and rate adaption, each of the two branches may be split again in two branches to isolate each individual channel. Likewise this may be done with LO3N, e.g. providing a signal $e^{-j\omega_{LO3}t}$, and LO3p, e.g. providing a signal $e^{j\omega_{LO3}t}$. The frequency $f_{LO3}$ may for example be 750 kHz. The four resulting channels may be further processed by rate decimation, filtering and discrimination, e.g. conversion of a signal having a predetermined bit width to a digital 0 or 1 signal representation, before the final signal is provided via the local signal port 7. The receiver may also comprise a configuration unit for selecting the redundant sideband channels encoding the same information stream, and the receiver may furthermore adapted to apply an aggregation of the streams derived from the sidebands, e.g. by averaging or another error correction scheme, e.g. a winner-takes-all assignment of bit values to the bit value of the channel presenting the strongest output or a digital majority vote assignment of bit value.

Embodiments of the present invention also relate to a modem 25, e.g. a modulator/demodulator device, for transmitting and receiving data over a power supply line, wherein the modem comprises a transmitter 1 according to embodiments of the present invention, and the modem comprises a receiver 6 according to embodiments of the present invention. Thus, a modem 25 according to embodiments comprises a local signal port 2 for receiving a serial bit stream and a local signal port 7 for transmitting a serial bit stream, e.g. the modem 25 may comprise a bidirectional local signal port for receiving and transmitting a serial bit stream. The modem 25 further comprises a power line connection port 3 for transmitting a radio frequency signal over a power supply line and a power line connection port 8 for receiving a radio frequency signal conducted over the power supply line, e.g. the modem 25 may comprise a power line connection port for transmitting and receiving a radio frequency signal via the a power supply line. The modem 25 comprises a modulator unit 5 for emitting a radio frequency signal to be transmitted and a demodulator unit 9 for processing a received radio frequency signal. It shall be clear to the person skilled in the art that the modulator unit 5 and the demodulator unit 9 may be substantially separate circuits, or may be integrated, e.g. both the modulator and the demodulator may comprise local oscillators, e.g. crystal oscillators, tuned to the same frequency, such that corresponding oscillating signals for the modulator and the demodulator may be derived from a shared physical local oscillator. Other components, such as an electronic mixer, e.g. a digital multiplier, an analog filter stage or a configuration unit may also be shared between the modulator portion and the demodulator portion of the device.

Figure 12:
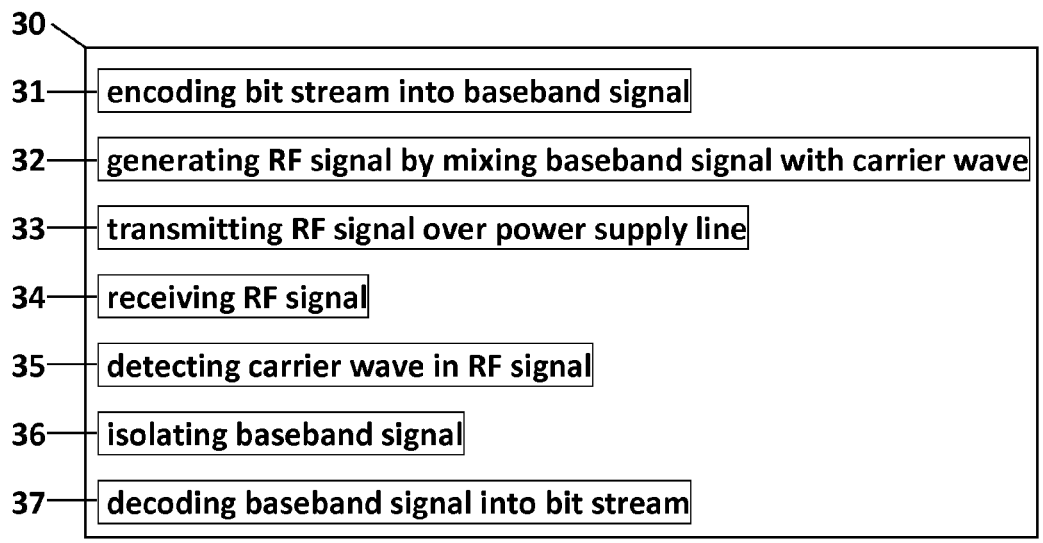
FIG. 12 schematically illustrates a method according to embodiments of the present invention.

The present invention further relates to a method for transferring data over a power supply line. FIG. 12 illustrates such an exemplary method 30 according embodiments of the invention.

The method comprises encoding 31 an input serial bit stream into a baseband signal, generating 32 a radio frequency signal by mixing the baseband signal with a carrier wave so as to redundantly convey the at least one baseband signal in at least four spectral sidebands of the carrier wave and transmitting 33 the radio frequency signal over a power supply line. The steps of encoding 31, generating 32 and transmitting 33 may be carried out by a transmitter 1 according to embodiments of the present invention, and further details relating to these steps may be described hereinabove in relation to such transmitter.

The method further comprises receiving 34 the radio frequency signal conducted over the power supply line, detecting 35 at least four spectral sidebands of the carrier wave in the radio frequency signal, isolating 36 the baseband signal from the at least four spectral sidebands of the carrier wave and decoding 37 the baseband signal into an output serial bit stream. The steps of receiving 34, detecting 35, isolating 36 and decoding 37 may be carried out by a receiver 6 according to embodiments of the present invention, and further details relating to these steps may be described hereinabove in relation to such receiver.

The method 30 may comprise transferring data corresponding to a plurality of logical LIN buses isolated in different carrier frequency components transmitted over the power supply line. For example the steps of encoding 31, generating 32, transmitting 33, receiving 34, detecting 35, isolating 36 and decoding 37 may be performed for a first input bit stream and a first output bit stream corresponding to communication over a first logical LIN bus with a first carrier wave having a first frequency and these steps may be independently, e.g. simultaneously, performed for a second input bit stream and a second output bit stream corresponding to communication over a second logical LIN bus with a second carrier wave having a second frequency different from the first frequency.

As already mentioned hereinabove, at least two asynchronous serial bit streams can thus be advantageously transmitted over the same power supply line. For example, in an exemplary embodiment of the present invention, a plurality of LIN buses, e.g. 15 LIN buses, can reliably communicate asynchronously over the same power supply line, e.g. each bus may be configured to use 4 channels out of 60 available channels, for example, in which the 4 channels may have a predefined frequency separation, e.g. preferably a predefined large frequency separation.

In a method 30 according to embodiments, the input serial bit stream and the output serial bit stream may be LIN-compatible data streams.

In a method 30 according to embodiments, encoding 31 of the input serial bit stream and decoding 37 of the baseband signal into the output serial bit stream may comprise encoding and decoding these streams using AM, FM, QPSK, FSK, MSK, ASK or a combination of such techniques.

In a method 30 according to embodiments, generating 32 of the radio frequency signal and detecting 35 of the carrier wave may comprise respectively generating and detecting the carrier wave having a predetermined frequency in the range of 22 MHz to 30 MHz.

The invention claimed is:

1. A transmitter for transmitting data over an automotive power supply line, the transmitter comprising:
    a local signal port for receiving a serial bit stream,
    a power line connection port for transmitting a radio frequency signal over an automotive power supply line, and
    a modulator unit for emitting said radio frequency signal, wherein the modulator unit is adapted for encoding said serial bit stream into a baseband signal and generating the radio frequency signal by mixing said baseband signal with a carrier wave so as to redundantly convey the baseband signal in at least four spectral sidebands of the carrier wave,
    wherein the modulator unit is adapted for shifting the baseband signal conveyed in at least one of said at least four spectral sidebands over a predetermined time delay relative to the baseband signal conveyed in at least one other of said at least four spectral sidebands.

2. The transmitter according to claim 1, wherein the local signal port comprises a local interconnect network bus connection for connecting to at least one local LIN-compatible device.

3. The transmitter according to claim 1, wherein the modulator unit is adapted for generating the carrier wave, in which the carrier wave has a predetermined frequency in the range of 22 MHz to 30 MHz.

4. The transmitter according to claim 1, wherein the modulator unit is furthermore adapted for generating the radio frequency signal such that the frequency spectrum of each of said at least four spectral sidebands is separated by at least 1 MHz from the frequency spectra of each other spectral sideband of said at least four spectral sidebands.

5. The transmitter according to claim 1, wherein the local signal port is adapted for receiving at least two serial bit streams and the modulator unit is adapted for encoding each of said at least two serial bit streams into a corresponding baseband signal.

6. The transmitter according to claim 5, wherein the modulator unit comprises at least one digital mixing stage for frequency shifting and combining said base band signals corresponding to the at least two serial bit streams.

7. A transmitter for transmitting data over an automotive power supply line, the transmitter comprising:
a local signal port for receiving a serial bit stream,
a power line connection port for transmitting a radio frequency signal over an automotive power supply line, and
a modulator unit for emitting said radio frequency signal, wherein the modulator unit is adapted for encoding said serial bit stream into a baseband signal and generating the radio frequency signal by mixing said baseband signal with a carrier wave so as to redundantly convey the baseband signal in at least four spectral sidebands of the carrier wave,
wherein the local signal port is adapted for receiving at least two serial bit streams and the modulator unit is adapted for encoding each of said at least two serial bit streams into a corresponding baseband signal, and
wherein the transmitter further comprises a configurer that configures the redundancy level provided by the transmitter so as to selectively route at least one of the at least two serial bit streams to at least one of the at least four spectral sidebands of the carrier wave.

8. A receiver for receiving data transmitted over an automotive power supply line, the receiver comprising:
a local signal port for transmitting a serial bit stream,
a power line connection port for receiving a radio frequency signal conducted over a power supply line, and
a demodulator unit for processing said radio frequency signal, wherein the demodulator unit is adapted for detecting at least four spectral sidebands of a carrier wave in said radio frequency signal, isolating a baseband signal from the at least four spectral sidebands of said carrier wave redundantly conveying said baseband signal, and decoding the baseband signal into the serial bit stream,
wherein said demodulator unit is adapted for shifting the baseband signal isolated from at last one of said at least four spectral sidebands over a predetermined time delay relative to the baseband signal isolated from at least one other of said at least four spectral sidebands.

9. A modem for transmitting and receiving data over an automotive power supply line, the modem comprising a transmitter according to claim 1.

10. A modem for transmitting and receiving data over an automotive power supply line, the modem comprising a receiver according to claim 8.

11. A method for transferring data over an automotive power supply line, the method comprising:
encoding an input serial bit stream into a baseband signal,
generating a radio frequency signal by mixing said baseband signal with a carrier wave so as to redundantly convey the at least one baseband signal in at least four spectral sidebands of the carrier wave,
transmitting said radio frequency signal over a power supply line,
receiving the radio frequency signal conducted over the power supply line,
detecting said at least four spectral sidebands of the carrier wave in said radio frequency signal,
isolating the baseband signal from the at least four spectral sidebands of the carrier wave, and
decoding the baseband signal into an output serial bit stream, and
transferring data corresponding to a plurality of logical LIN buses isolated in different carrier frequency components transmitted over the power supply line.

12. The method according to claim 11, wherein encoding the input serial bit stream comprises encoding a LIN-compatible data stream.

13. The method according to claim 11, wherein decoding the baseband signal into an output serial bit stream comprises decoding the baseband signal into a LIN-compatible data stream.

14. The method according to claim 11, wherein the generating of the radio frequency signal and the detecting at least four spectral sidebands of the carrier wave comprise respectively generating and detecting the at least four spectral sidebands of the carrier wave having a predetermined frequency in the range of 22 MHz to 30 MHz.

15. A transmitter for transmitting data over an automotive power supply line, the transmitter comprising:
a local signal port for receiving a serial bit stream,
a power line connection port for transmitting a radio frequency signal over an automotive power supply line, and
a modulator unit for emitting said radio frequency signal, wherein the modulator unit is adapted for encoding said serial bit stream into a baseband signal and generating the radio frequency signal by mixing said baseband signal with a carrier wave so as to redundantly convey the baseband signal in at least four spectral sidebands of the carrier wave,
wherein the local signal port comprises a local interconnect network bus connection for connecting to at least one local LIN-compatible device, wherein the modulator unit is adapted for generating the carrier wave, in which the carrier wave has a predetermined frequency in the range of 22 MHz to 30 MHz, and
wherein the modulator unit is furthermore adapted for generating the radio frequency signal such that the frequency spectrum of each of said at least four spectral sidebands is separated by at least 1 MHz from the frequency spectra of each other spectral sideband of said at least four spectral sidebands.

16. The transmitter according to claim 7, wherein the configurer includes dip switches.

17. The transmitter according to claim 7, wherein the configurer includes a flashable memory.

18. The transmitter according to claim 7, wherein the configurer includes a processor that receives, decodes, and effects a configuration instruction via a signal line.

* * * * *